United States Patent Office 3,510,470
Patented May 5, 1970

3,510,470
PHENYL-AZO-ANALINE DYES
Joseph B. Dickey and Max A. Weaver, Kingsport, Tenn., assignors to Eastman Kodak Company, Rochester, N.Y., a corporation of New Jersey
No Drawing. Filed May 2, 1966, Ser. No. 546,504
Int. Cl. C07c 107/06; C09b 29/08, 29/24
U.S. Cl. 260—207.1                                    7 Claims

ABSTRACT OF THE DISCLOSURE

Phenyl-azo-aniline compounds in which a group, having the formula:

$$-R^3-O-\overset{O}{\underset{}{C}}-\overset{R^4}{\underset{R^5}{C}}-\overset{O}{\underset{}{C}}-\overset{R^6}{\underset{R^7}{C}}H$$

wherein $R^3$ is alkylene and $R^4$, $R^5$, $R^6$ and $R^7$ each is alkyl or phenyl, is attached to the aniline nitrogen atom are useful as dyes for hydrophobic textile materials.

---

This invention relates to novel water insoluble azo compounds useful as dyes for hydrophobic textile fibers, yarns and fabrics.

The azo compounds of the invention are characterized by the general formula:

(I)  $\text{R}-\text{N}=\text{N}-\text{R}^1-\overset{R^2}{\underset{}{N}}-\text{R}^3-\text{Z}$ wherein R is a monocyclic carbocyclic aromatic group of the benzene series having the structure:

$$\underset{X}{\overset{X^2}{X^1-\underset{}{\bigcirc}}}$$

wherein:
X is hydrogen; chlorine; bromine; lower alkylsulfonyl, e.g. methylsulfonyl; or nitro;
$X^1$ is nitro; lower alkylsulfonyl, e.g. methylsulfonyl; cyano; trifluoromethyl; sulfamoyl; lower alkylsulfamoyl, e.g. dimethylsulfamoyl; lower alkanoyl, e.g. acetyl; lower carbalkoxyl, e.g. carbethoxy; carbamoyl; or propionoxy; and
$X^2$ is hydrogen; chlorine; bromine; or cyano;

$$\underset{Y}{\overset{Y^1}{\underset{}{\bigcirc}}}$$

wherein:
Y is hydrogen; lower alkyl, i.e. from 1 to about 4 carbon atoms; lower alkoxy, e.g. methoxy; lower alkanoylamino, e.g. acetamido; chlorine, bromine; lower alkylsulfonamido, e.g. methylsulfonamido, ethylsulfonamido; or benzamido; and
$Y^1$ is hydrogen; lower alkyl; or lower alkoxy;
$R^2$ represents hydrogen or an alkyl radical, preferably lower alkyl, i.e. from 1 to about 4 carbon atoms, being unsubstituted or substituted such as hydroxyalkyl, e.g. hydroxyethyl; polyhydroxyalkyl, e.g. 2,3-dihydroxypropyl; lower alkoxyalkyl, e.g. methoxyethyl; cyanoalkyl, e.g. cyanoethyl; cyanoalkoxyalkyl, e.g. beta-cyanoethoxyethyl; lower alkanoyloxyalkyl, e.g. acetoxyethyl; lower carbalkoxyalkyl, e.g. carbethoxyethyl; halogenoalkyl, e.g. chloroethyl; hydroxyhalogenoalkyl, e.g. beta-hydroxy-gamma-chloropropyl; lower alkylsulfonylalkyl, e.g. methylsulfonylethyl; lower akyl-OCOOCH$_2$CH$_2$—, e.g. CH$_3$OCOOCH$_2$CH$_2$—; carbamoylalkyl, e.g. carbamoyl-ethyl; lower alkylcarbamoylalkyl, e.g. ethylcarbamoylethyl; benzyl; phenoxyalkyl, e.g. beta-phenoxyethyl; alkylsulfonamidoalkyl, e.g. methylsulfonamidoethyl; etc. or $R^2$ represents a monocyclic carbocyclic aromatic group of the benzene series, e.g. phenyl, lower alkylphenyl, lower alkoxy-phenyl, halophenyl, etc. or $R^2$ may have the structure

[$R^3$—Z]

$R^3$ represents an alkylene radical, preferably lower alkylene of 2 to 4 carbon atoms and may be nonsubstituted or substituted alkylene such as 2-chloromethylethylene, 2-methoxymethylethylene, 2-phenoxymethylethylene, etc.;

Z represents a radical having the structure $$-O-\overset{O}{\underset{}{C}}-\overset{R^4}{\underset{R^5}{C}}-\overset{O}{\underset{}{C}}-\overset{R^6}{\underset{R^7}{C}}H$$

wherein $R^4$, $R^5$, $R^6$ and $R^7$ may be the same or different and represent hydrogen or an alkyl or alkenyl radical of from 1 to 8 carbon atoms such as methyl, ethyl, propyl, butyl, isobutyl, hexyl, heptyl, octyl, propenyl, etc. or $R^4$, $R^5$, $R^6$ and $R^7$ represent a monocyclic carbocyclic aromatic group of the benzene series as represented by R.

As will be seen from the example given below, the substituents on $R^2$ and $R^3$ and the substituents designated as X and Y, above, serve primarily as auxochrome groups to control the color of the azo compound.

The azo compounds of the invention are prepared by coupling the diazonium salts of compounds having the formula:

(II)                    R—NH$_2$ with a β-keto ester having the formula:

$$\text{R}^1-\overset{R^2}{\underset{}{N}}-\text{R}^3-O-\overset{O}{\underset{}{C}}-\overset{R^4}{\underset{R^5}{C}}-\overset{O}{\underset{}{C}}-\overset{R^6}{\underset{R^7}{C}}H$$

(III)

wherein R, $R^1$, $R^2$, $R^3$, $R^4$, $R^5$, $R^6$ and $R^7$ are defined above. The compounds of Formula III may be prepared by the following known methods:

(A) Reaction of N-hydroxyalkylaniline compounds with tetraalkyl-1,3-cyclobutanediones $$\text{R}^1-\overset{R^2}{\underset{}{N}}-\text{R}^3-\text{OH} + \underset{\underset{R^7}{|}}{\overset{R^4}{\underset{|}{O=C-C-R^5}}} \overset{}{\underset{R^6-C-C=O}{|}} \xrightarrow{\text{acid or base}}$$

$$\text{R}^1-\overset{R^2}{\underset{}{N}}-\text{R}^3-O-\overset{O}{\underset{}{C}}-\overset{R^4}{\underset{R^5}{C}}-\overset{O}{\underset{}{C}}-\overset{R^6}{\underset{R^7}{C}}H$$

(B) Reaction of N-hydroxyalkylaniline compounds with β-lactones of 2,2,4,4-tetraalkyl-3-hydroxy-3-butenoic acids $$\text{R}^1-\overset{R^2}{\underset{}{N}}-\text{R}^3-\text{OH} + \text{R}^7-\overset{R^6}{\underset{|}{C}}-\overset{R^4}{\underset{|}{C}}-R^5 \xrightarrow{\text{acid or base}}$$
$$\overset{|\quad|}{O-C=O}$$

$$\text{R}^1-\overset{R^2}{\underset{}{N}}-\text{R}^3-O-\overset{O}{\underset{}{C}}-\overset{R^4}{\underset{R^5}{C}}-\overset{O}{\underset{}{C}}-\overset{R^6}{\underset{R^7}{C}}H$$

wherein $R^1$, $R^2$, $R^3$, $R^4$, $R^5$, $R^6$ and $R^7$ are defined above.

The azo compounds of the invention are used for dyeing textile materials, including synthetic polymer fibers, yarns and fabrics, a wide variety of shades ranging from yellow to blue which are extremely fast to light and sublimation and, further, have excellent fastness to washing and gas (atmospheric fumes).

The following examples will serve to illustrate the prep-

3 aration of representative couplers and azo compounds of the invention.

PREPARATION OF THE COUPLERS

Preparation of 2-(N-ethyl-m-toluidino)ethyl-2,2,4-trimethyl-3-oxyvalerate

An amount of 2 g. 50% NaH (mineral oil dispersion) was added to 179 g. N-ethyl-N-β-hydroxyethyl-m-toluidine with stirring. After some foaming had subsided, 140 g. 2,2,4,4-tetramethyl-1,3-cyclobutanedione was added portionwise at such a rate that the reaction temperature did not exceed 75° C. The reaction mixture was stirred 30 min. at approximately 50° C., after which it was allowed to cool to room temperature. After acidification with 5 ml. of conc. HCl, the reaction mixture was washed with water, and distilled in vacuo to give 228.3 g. of product boiling at 154–157° C. at .8 mm., $n_D^{20}$—1.5109. The compound had the structure:

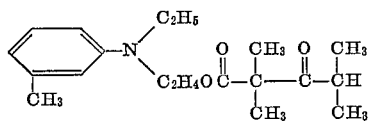

This compound may also be prepared in good yield from N-ethyl-N-β-hydroxyethyl-m-toluidine and 2,2,4-tetramethyl-3-hydroxy-3-butenoic acid β-lactone under essentially the same conditions.

Preparation of 2,2'-m-toluidinodiethanol bis-(2,2,4-trimethyl)-3-oxyvalerate To 97.5 g. 2,2'-m-toluidinodiethanol was added 2 g. 50% sodium hydride (mineral oil dispersion) with stirring. After the foaming subsided, 140 g. 2,2,4,4-tetramethyl-1,3-cyclobutanedione was added portionwise at less than 95° C. External cooling was required. The mixture was stirred 2 hr. longer, allowing to cool to room temperature. After acidification with 5 ml. conc. HCl, the reaction mixture was washed with water, and distilled in vacuo to give 133.5 g. product which boiled 190–207° C. (0.8–1.8 mm.), $n_D^{20}$—1.4947–1.4962. The product had the following structure:

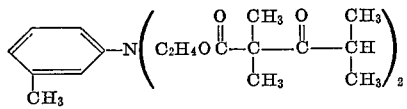

Preparation of 2-(N-2-cyanoethylanilino)ethyl-2,4-diethyl-2-methyl-3-oxyvalerate To 38.0 g. dry N-β-cyanoethyl-N-β-hydroxyethylaniline was added 2 g. 50% NaH (mineral oil dispersion) with stirring. Some foaming occurred. 33.6 g. 2,4-diethyl-2,4-dimethyl-1,3-cyclobutanedione was added portionwise with stirring at less than 90° C. After about one half of the material had been added an additional .5 g. 50% NaH was introduced. The reaction mixture was stirred 2 hr. longer, allowing to cool to room temperature. To the reaction mixture was added 5 ml. conc. HCl and then 200 ml. water. After stirring about 1 hr. the product was extracted with 2–75 ml. portions of chloroform, washed with water, and dried over anhydrous sodium sulfate. Removal of the chloroform under vacuum gave 69.0 g. of product, which had the following structure:

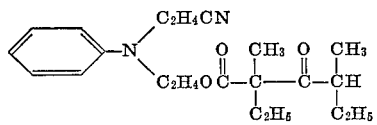

In the manner described above, all of the couplers subsequently described were prepared by reacting the appropriate N-hydroxyalkylaniline with 2,2,4,4-tetraalkyl-1,3-cyclobutanediones or 2,2,4-tetraalkyl-3-hydroxy-3-butenoic acids. Alternative methods for reacting ketene dimers with alcohols are described in the literature.

4

EXAMPLES OF THE DYES

Example 1

An amount of 6.21 g. 2,6-dichloro-4-nitroaniline was dissolved in 37.5 cc. conc. $H_2SO_4$ at near 25° C. The solution was chilled and a solution of 2.2 g. dry $NaNO_2$ in 15 cc. conc. $H_2SO_4$ was added below 5° C. The diazotization was stirred at 0–5° C. for 2 hr., then added to a chilled solution of 2-(N-ethyl-m-toluidino)ethyl-2,2,4-trimethyl-3-oxyvalerate (9.57 g.) in 300 cc. 15% $H_2SO_4$. The coupling was neutralized with solid ammonium acetate to brown on Congo Red paper. After coupling 2 hr., the mixture was drowned with water, filtered, washed with water and dried. The product dyed polyester fibers a desirable brown shade of excellent light and sublimation fastness. The dye had the following structure:

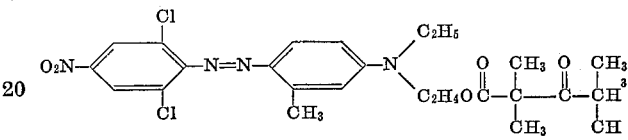

Example 2

A solution of 3.6 g. dry sodium nitrite in 25 cc. conc. sulfuric acid was cooled in an ice-bath and 50 cc. 1:5 acid (1 part propionic:5 parts acetic) was added below 15° C. This solution was stirred at 0–5° C. and 10.8 g. 2-methylsulfonyl-4-nitroaniline was added, followed by 50 cc. 1:5 acid. The diazotization was stirred at 0–5° C. for 2 hr., then added to a solution of 15.2 g. 2-(N-ethylanilino)ethyl-2,2,4-trimethyl-3-oxyvalerate dissolved in 500 cc. 1:5 acid. The coupling was kept cold and neutralized to Congo Red paper with solid ammonium acetate. After coupling 2 hr., the mixture was drowned with water, filtered, washing with water and dried in air. The dye, which dyed polyester fibers a red shade of good fastness properties, had the following structure:

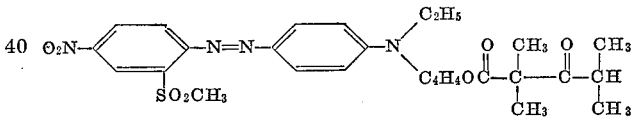

Example 3

An amount of 2.70 g. m-Aminoacetophenone was dissolved in 20 cc. water containing 6 cc. conc. HCl. The solution was cooled and a solution of 1.44 g. $NaNO_2$ in 4 cc. water was added at less than 5° C. After stirring one hour at 0–5° C., the solution was poured into a solution of 6.60 g. 2-(N-2-cyanoethylanilino)ethyl-2,4-diethyl-2-methyl-3-oxyvalerate in 200 cc. 5% HCl containing ice. The coupling was neutralized with $NaHCO_3$ and allowed to couple cold for 2 hr. The mixture was filtered, washed with water, and dried at room temperature. The product dyed cellulose acetate and polyester fibers bright shades of yellow of good fastness properties. The dye had the following structure:

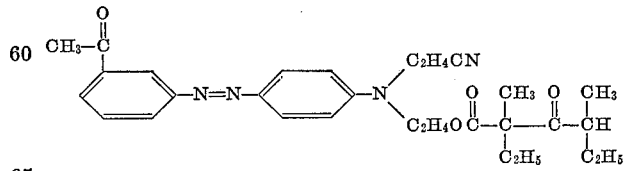

Example 4

2-methylsulfonyl-4-nitroaniline (10.8 g.) was diazotized as in Example 2 and added to a solution of 15.9 g. 2-(N-ethyl-m-toluidino)ethyl-2,2,4-trimethyl-3-oxyvalerate in 500 ml. 1:5 acid, all at about 5° C. The coupling was kept at below 10° C. and neutralized to Congo Red paper with ammonium acetate. After coupling 2 hr., the mixture was drowned with water, filtered, washed with water, and air dried. The dye, which dyed polyester fibers bright violet shades, had the following structure:

Example 5

A solution of 0.72 g. dry $NaNO_2$ dissolved in 5 ml. conc. $H_2SO_4$ was cooled in ice bath, and 10 ml. 1:5 acid (1 part propionic: 5 parts acetic acid) was added below 15° C. This solution was stirred at about 5° C. and 1.72 g. of 2-chloro-4-nitroaniline was added, followed by 10 ml. 1:5 acid. The diazotization reaction was stirred 2 hr. and added to a chilled solution of 3.44 g. 2-(N-β-cyanoethylethyl-m-toluidino)ethyl-2,2,4-trimethyl-3-oxyvalerate. This coupling was kept below 10° C. and buffered with solid ammonium acetate. After coupling 2 hr., the mixture was drowned in water, filtered, washed with water, and air dried. The product dyed polyester fibers a deep orange shade and had the following structure:

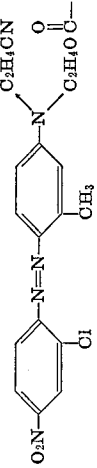

Example 6

2,6-dichloro-4-nitroaniline (2.07 g.) was diazotized as in Example 1 and added to a solution of 3.05 g. 2-(N-ethylanilino)ethyl-2,2,4-trimethyl-3-oxyvalerate in 50 ml. 15% $H_2SO_4$ at about 5° C. The coupling was kept cold and buffered with ammonium acetate. After coupling 2 hr., the mixture was drowned with water, filtered, washed with water, and air dried. The product dyed polyester fibers a desirable brown shade and had the following structure:

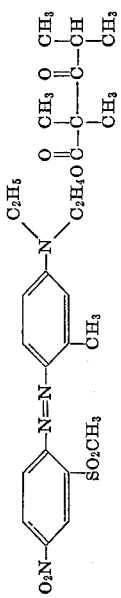

The azo compounds illustrated in the following table were prepared by the method illustrated in Examples 1 through 6. Thus, the compounds represented by Formula II were coupled with the compounds of Formula III to obtain the dyes having the general Formula I, above.

TABLE

| Example No. | X | Y | R² | R³ | R⁴ | R⁵ | R⁶ | R⁷ | Color |
|---|---|---|---|---|---|---|---|---|---|
| 7 | 2,6-di-Cl-4-NO₂ | 3-CH₃ | —CH₃ | —CH₂—CH₂— | CH₃ | —CH₃ | —CH₃ | —CH₃ | Reddish-brown. |
| 8 | 2,6-di-Cl-4-NO₂ | 3-CH₃ | —CH₃ | —CH₂—CH₂— | —CH₃ | —CH₃ | —CH₃ | —CH₃ | Do. |
| 9 | 2,6-di-Cl-4-NO₂ | 3-CH₃ | —C₂H₅ | —CH₂—CH₂— | H | —C₂H₅ | H | H | Do. |
| 10 | 2,6-di-Cl-4-NO₂ | 3-OCH₃ | —C₂H₅ | —CH₂—CH₂— | H | —C₂H₅ | —C₂H₅ | —C₂H₅ | Do. |
| 11 | 2,6-di-Cl-4-NO₂ | 3-OCH₃ | —C₆H₅ | —CH₂—CH₂— | —C₂H₅ | —CH₃ | —CH₃ | —CH₃ | Do. |
| 12 | 2,6-di-Cl-4-NO₂ | 3-OCH₃ | —C₂H₅ | —CH₂—CH₂— | —CH₃ | —CH₃ | —CH₃ | —CH₃ | Do. |
| 13 | 2,6-di-Cl-4-NO₂ | 3-Cl | —C₃H₇-n | —CH₂—CH₂— | —C₃H₇-n | —CH₃ | —C₂H₅ | —CH₃ | Do. |
| 14 | 2,6-di-Cl-4-NO₂ | 3-Cl | —C₃H₇-n | —CH₂—CH₂— | —CH₃ | —CH₃ | —C₃H₇-n | —C₃H₇-n | Do. |
| 15 | 2,6-di-Cl-4-NO₂ | 3-CH₃ | —C₂H₄CN | —CH₂—CH₂— | —CH₃ | —CH₃ | —CH₃ | —CH₃ | Red. |
| 16 | 2-SO₂CH₃-4-NO₂ | 3-CH₃ | —C₂H₄OH | —CH₂—CH₂— | —CH₃ | —CH₃ | —CH₃ | —CH₃ | Do. |
| 17 | 2-SO₂CH₃-4-NO₂ | 3-CH₃ | | | | | | | Do. |
| 18 | 2-SO₂CH₃-4-NO₂ | 3-NHC(O)CH₃ | —C₂H₅ | —CH₂—CH₂— | —C₂H₅ | —C₂H₅ | —C₂H₅ | —C₂H₅ | Do. |
| 19 | 2-SO₂CH₃-4-NO₂ | 3-NHC(O)— | —C₄H₉-n | —CH₂—CH₂— | —C₄H₉-n | —C₄H₉-n | —C₄H₉-n | —C₄H₉-n | Do. |
| 20 | 2-SO₂CH₃-4-NO₂ | 3]CH₃ | —C₂H₅ | —CH₂—CH₂— | —CH₃ | —C₂H₅ | —CH₃ | —C₂H₅ | Do. |
| 21 | 2-SO₂CH₃-4-NO₂ | 2,5-di-OCH₃ | —C₂H₅ | —CH₂—CH₂— | —CH₂C₆H₅ | —CH₂C₆H₅ | —CH₂C₆H₅ | —CH₂C₆H₅ | Violet. |
| 22 | 2-SO₂CH₃-4-NO₂ | 3-CH₃ | —C₂H₅ | —CH₂—CH₂— | —CH₃ | —CH₂C₆H₅ | —CH₃ | —CH₃ | Red. |
| 23 | 2-SO₂CH₃-4-NO₂ | 3-CH₃ | —C₂H₅ | —CH₂—CH₂— | —CH₃ | —CH₃ | —CH₃ | —CH₂—CH=CH₂ | Do. |
| 24 | 2-SO₂CH₃-4-NO₂ | 3-CH₃ | —C₂H₄Cl | —CH₂—CH₂— | —CH₃ | —CH₃ | —CH₃ | —CH₂—CH=CH₂ | Do. |
| 25 | 2-SO₂CH₃-4-NO₂ | 3-CH₃ | —C₂H₄Cl | —CH₂—CH₂— | —C₁₅H₁₅-n | —C₁₅H₁₅-n | —CH₃ | —C₁₅H₁₅-n | Do. |
| 26 | 2-SO₂CH₃-4-NO₂ | 3-CH₃ | —C₂H₅ | —CH₂—CH₂— | H | i-Butyl | H | i-Butyl | Do. |
| 27 | 2-CN-4-NO₂ | 3-NAC(O)CH₃-6-OCH₃ | R³—O—C(O)—C(R⁴)(R⁵)—CH(R⁶)(R⁷) | —CH₂—CH₂— | —CH₃ | —CH₃ | —CH₃ | —CH₃ | Blue. |
| 28 | 2-CN-4-NO₂ | 3-NAC(O)CH₃-6-OCH₃ | R³—O—C(O)—C(R⁴)(R⁵)—CH(R⁶)(R⁷) | —CH₂—CH₂— | —C₂H₅ | —C₂H₅ | —C₂H₅ | —C₂H₅ | Do. |
| 29 | 2-Cl-4-NO₂-6-CN | 3-NAC(O)CH₃-6-OCH₃ | R³—O—C(O)—C(R⁴)(R⁵)—CH(R⁶)(R⁷) | —CH₂—CH₂— | —CH₃ | —CH₃ | —CH₃ | —CH₃ | Do. |

TABLE—Continued

| | X | Y | R² | R³ | R⁴ | R⁵ | R⁶ | R⁷ | Color |
|---|---|---|---|---|---|---|---|---|---|
| | | | R₂—O—C—O—C—C—CH—R⁷<br>      ‖    ‖   \|    \|<br>      O    O  R⁵   R⁶ | | | | | | |
| 30 | 2-Cl-4,6-di-NO₂ | 3-NHCCH₃-6-OCH₃<br>   ‖<br>   O | | —CH₂—CH₂— | —CH₃ | —CH₃ | —CH₃ | —CH₃ | Do. |
| 31 | 2-Cl-4,6-di-NO₂ | 3-NHCCH₃-6-OCH₃<br>   ‖<br>   O | —C₂H₅ | —CH₂—CH₂— | —CH₃ | —CH₃ | —CH₃ | —CH₂— | Do. |
| 32 | 4-NO₂ | 3-CH₃ | —C₂H₅ | —CH₂—CH₂— | —CH₃ | —CH₃ | —CH₃ | —CH₃ | Scarlet. |
| 33 | 2,4-bis-SO₂CH₃ | None | —C₂H₄OCH₃ | —CH₂—CH₂— | —CH₃ | —CH₃ | —CH₃ | —CH₃ | Orange. |
| 34 | 2,4-bis-SO₂CH₃ | None | —CH₂—CH—CH₃<br>           \|<br>           CH₃ | —CH₂—CH₂— | —C₆H₅ | —C₆H₅ | —C₆H₅ | C₆H₅ | Do. |
| 35 | 2,4-vis-SO₂CH₃ | None | —C₂H₄CONH₂ | —CH₂—CH₂— | —CH₃ | —CH₃ | —CH₃ | —CH₃ | Do. |
| 36 | 2,4-bis-SO₂CH₃ | None | —C₂H₄CONH₂ | —CH₂—CH₂— | —CH₃ | —CH₃ | —CH₃ | —CH₃ | Do. |
| 37 | 2,4-bis-SO₂CH₃ | None | —C₂H₄O₂CCH₃<br>         ‖<br>         O | —CH₂—CH₂— | —CH₃ | —CH₃ | —CH₃ | —CH₃ | Do. |
| 38 | 4-CN | None | —C₆H₅ | —CH₂—CH₂— | —CH₃ | —CH₃ | —CH₃ | —CH₃ | Yellow. |
| 39 | 4-CH₃ | 3-CH₃ | —C₆H₅ | —CH₂—CH₂— | —CH₃ | —CH₃ | —CH₃ | —CH₃ | Do. |
| 40 | 4-CF₃ | 3-CH₃ | —C₆H₅ | —CH₂—CH₂— | —CH₃ | —C₂H₅ | —CH₃ | —C₂H₅ | Orange. |
| 41 | 4-SO₂NH₂ | 3-CH₃ | —C₆H₅ | —CH₂—CH₂— | —CH₃ | —C₆H₅ | —CH₃ | —C₆H₅ | Do. |
| 42 | 4-SO₂CH₃ | 3-CH₃ | —C₆H₅ | —CH₂—CH₂— | —CH₃ | —CH₃ | —CH₃ | —CH₃ | Do. |
| 43 | 3-SO₂N(CH₃)₂ | 2-CH₃ | H | —CH₂—CH₂— | —CH₃ | —CH₃ | —CH₃ | —CH₃ | Do. |
| 44 | 3-CHO | 3-CH₃ | —C₂H₅ | —CH₂—CH₂— | —CH₃ | —CH₃ | —CH₃ | —CH₃ | Do. |
| 45 | 4-NHCCH₃<br>   ‖<br>   O | 3-CH₃ | —C₂H₅ | —CH₂—CH₂— | —CH₃ | —CH₃ | —CH₃ | —CH₃ | Yellow. |
| 46 | 4-C—CH₃<br>   ‖<br>   O | 3-CH₃ | —C₂H₅ | —CH₂—CH₂— | —CH₃ | —CH₃ | —CH₃ | —CH₃ | Orange. |
| 47 | 4-OCC₂H₅<br>   ‖<br>   O | 3-CH₃ | —C₂H₅ | —CH₂—CH₂— | —CH₃ | —CH₃ | —CH₃ | —CH₃ | Do. |
| 48 | 4-C—NH₂<br>   ‖<br>   O | 3-CH₃ | —C₂H₅ | —CH₂—CH₂— | —CH₃ | —CH₃ | —CH₃ | —CH₃ | Do. |
| 49 | 4-COC₂H₅<br>   ‖<br>   O | 3-CH₃ | —C₂H₅ | —CH₂—CH₂— | —CH₃ | —CH₃ | —CH₃ | —CH₃ | Do. |
| 50 | 4-C—NH₂<br>   ‖<br>   O | 3-CH₃ | —C₂H₅ | —CH₂—CH—<br>       \|<br>       CH₂Cl | —CH₃ | —CH₃ | —CH₃ | —CH₃ | Do. |
| 51 | 4-NO₂ | 3-CH₃ | —C₂H₅ | —CH₂—CH—<br>       \|<br>       CH₂Cl | —CH₃ | —CH₃ | —CH₃ | —CH₃ | Do. |
| 52 | 2-Cl-4-NO₂ | 3-CH₃ | —C₂H₅ | —CH₂—CH—<br>       \|<br>       CH₂OCH₃ | —CH₃ | —CH₃ | —CH₃ | —CH₃ | Scarlet. |
| 53 | 2-Cl-4-NO₂ | 3-CH₃ | —C₂H₅ | —CH₂—CH—<br>       \|<br>       CH₂OCH₃ | —CH₃ | —CH₃ | —CH₃ | —CH₃ | Do. |
| 54 | 2-SO₂CH₃-4-NO₂ | 3-CH₃ | —C₂H₅ | —CH₂—CH—<br>       \|<br>       CH₂O—C₆H₅ | —CH₃ | —CH₃ | —CH₃ | —CH₃ | Violet. |

The azo compounds of the invention can be used for dyeing textile materials, including protein and synthetic polymer fibers, yarns and fabrics, giving a variety of fast brilliant yellow to blue shades, including orange, violet, red and scarlet, when applied thereto by conventional dye methods. The azo compounds have high affinity for cellulose ester, polyester, and nylon fibers. When the azo compounds are used for dyeing such hydrophobic materials, they should be free of water-solubilizing groups such as sulfo and carboxyl. In general, the dyes have excellent fastness, for example, to light, washing gas (atmospheric fumes) and sublimation. The dyes are outstanding light fast and sublimation resistant on polyester fibers.

As described above, the present azo compounds have the characteristic structure of Formula I. This distinctive structure imparts unexpected properties to the azo compounds, including the above-described light fastness and affinity for protein and synthetic polymer fibers, yarns and fabrics. Thus, the compounds of the invention, in general, have been found to possess properties superior to similar but distinct compounds when tested by methods such as described in the A.A.T.C. Technical Manual, 1964 edition, depending in part upon the particular dye used and the fiber being dyed.

The azo compounds of the invention can be used for dyeing hydrophobic fibers such as linear polyester, cellulose ester, acrylic, polyamide, etc., fibers in the manner described in U.S. Pats. 2,880,050, 2,757,064, 2,782,187 and 2,043,827. The following example illustrates a method by which the azo compounds of the invention can be used to dye polyester textile materials.

0.1 g. of the dye is dissolved in the dye pot by warming in 5 cc. of ethylene glycol monomethyl ether. A 2% sodium-N-methyl-N-oleyl taurate and 0.5% sodium lignin sulfonate aqueous solution is added, with stirring, until a fine emulsion is obtained. Water is then slowly added to a total volume of 200 cc. 3 cc. of Dacronyx (a chlorinated benzene emulsion) are added and 10 grams of a textile fabric made of Kodel polyester fibers are entered. The fabric is worked 10 minutes without heat and then for 10 minutes at 80° C. The dye bath is then brought to the boil and held at the boil for one hour. Following this, the fabric is rinsed in warm water, then scoured in aqueous 0.2% soap, 0.2% soda ash solution. After scouring, the fabric is rinsed with water and dried. Accordingly, since the azo compounds of the invention are water-insoluble, they can be applied from aqueous dispersions in the manner of the so-called "dispersed dyes." However, coloration can also be effected, for example, by incorporating the azo compounds into the spinning dope and spinning the fiber as usual. The azo compounds of the invention are not necessarily equivalent dyes. The degree of superiority over known compounds varies, for example, depending upon the material being dyed and the structure of the particular azo compound of the invention. Thus, for example, not all the compounds of the invention will have the same degree of dye affinity for the same material. For example, the substituents X and Y and the substituents on the $R^2$ and $R^3$ radicals, as mentioned above, serve primarily as auxochrome groups to control the color of the azo compound.

Polymeric linear polyester materials of the terephthalate type are illustrative of the linear aromatic polyester textile materials that can be dyed with the new azo compounds of our invention. The terephthalate fibers sold under the trademarks "Kodel," "Dacron," and "Terylene," for example, are illustrative of the polyester textile materials that can be dyed. Kodel polyester fibers are more particularly described in U.S. Pat. 2,901,446. Dacron and Terylene polyester fibers are described, for example, in U.S. Pat. 2,465,319. The polymeric linear polyester materials disclosed in U.S. Pat. 2,945,010, 2,957,745, and 2,989,363 for example, can be dyed. The linear aromatic polyester materials specifically named have a melting point of at least 200° C.

Nylon, in fiber, yarn and fabric form, is representative of polyamides which can be dyed with the azo compounds.

The invention has been described in considerable detail with particular reference to certain preferred embodiments thereof, but it will be understood that variations and modifications can be effected within the spirit and scope of the invention as described above and as defined in the appended claims.

We claim:

1. A water-insoluble azo compound having the formula:

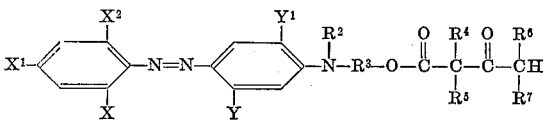

wherein

X is hydrogen, chlorine, bromine, lower alkylsulfonyl, or nitro;

$X^1$ is nitro, lower alkylsulfonyl, cyano, trifluoromethyl, sulfamoyl, lower alkylsulfamoyl, lower alkanoyl, lower carbalkoxyl, carbamoyl, or propionoxy;

$X^2$ is hydrogen, chlorine, bromine, or cyano;

Y is hydrogen, lower alkyl, lower alkoxy, chlorine, bromine, lower alkanoylamino, benzamido, or lower alkylsulfonamido;

$Y^1$ is hydrogen, lower alkyl or lower alkoxy;

$R^2$ is hydrogen; lower alkyl; lower alkyl substituted with hydroxy, lower alkoxy, cyano, lower alkanoyloxy, lower carbalkoxy, chlorine, bromine, lower alkylsulfonyl, carbamoyl, lower alkylcarbamoyl, phenoxy, or lower alkylsulfonamido; benzyl; lower alkyl-OCOOCH$_2$CH$_2$—; phenyl; phenyl substituted with lower alkyl, lower alkoxy, chlorine or bromine; or a group having the formula

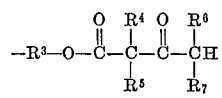

$R^3$ is lower alkylene, lower chloroalkylene, lower methoxyalkylene, or lower phenoxyalkylene; and $R^4$, $R^5$, $R^6$ and $R^7$ are the same or different and each is alkyl of 1 to 4 carbon atoms or phenyl.

2. A compound according to claim 1 wherein:

$R^2$ is lower alkyl or lower alkyl substituted with hydroxy, chlorine, bromine, cyano or lower alkanoyloxy;

$R^3$ is lower alkylene; and $R^4$, $R^5$, $R^6$ and $R^7$ each is methyl or ethyl.

3. An azo compound as defined in claim 1 having the formula:

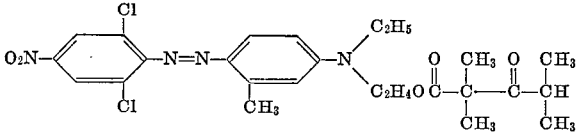

4. An azo compound as defined in claim 1 having the formula:

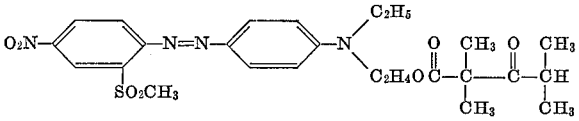

5. An azo compound as defined in claim 1 having the formula:

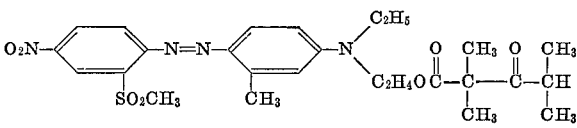

6. An azo compound as defined in claim 1 having the formula:
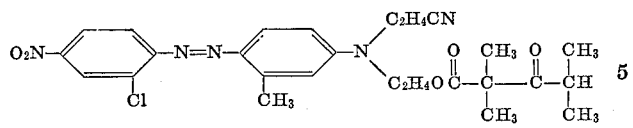
7. An azo compound as defined in claim 1 having the formula:
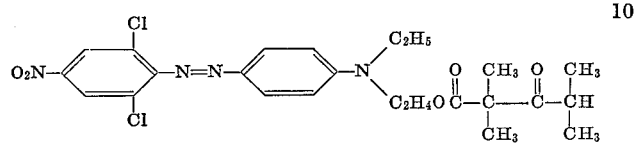
References Cited
UNITED STATES PATENTS
3,406,164 10/1968 Altermatt et al. ____ 260—207.1
FOREIGN PATENTS
1,333,119 6/1963 France.
CHARLES B. PARKER, Primary Examiner
C. F. WARREN, Assistant Examiner
U.S. Cl. X.R.
8—41; 260—207